3,041,312
ANIONIC POLYMERIZATION PROCESS
Thomas Boyd, Springfield, Mass., assignor to Monsanto Chemical Company, St. Louis, Mo., a corporation of Delaware
No Drawing. Filed July 31, 1959, Ser. No. 830,712
6 Claims. (Cl. 260—47)

This invention relates to the polymerization of anionically-polymerizable monomers. More particularly, the invention relates to a process which permits control of the average molecular weight and molecular weight distribution of polymers formed by polymerizing vinylidene monomers in the presence of anionic catalysts.

One object of this invention is to provide an improved anionic polymerization process.

Another object is to provide an improved process which permits control of the average molecular weight and molecular weight distribution of polymers formed by polymerizing vinylidene monomers in the presence of anionic catalysts.

These and other objects are attained by mixing an anionically-polymerizable vinylidene monomer with an anionic catalyst at a rate at least four times faster than the polymerization rate. The polymer thus formed has a narrow molecular weight distribution and a predetermined average molecular weight which is a function of the catalyst concentration.

Various terms used throughout the specification are to be understood as having the following connotations:

(1) The substantial absence of water, oxygen, carbon dioxide, and Lewis acids indicates the presence of fewer equivalents of these contaminants than of anionic catalyst, preferably not more than 10 equivalent percent of the contaminants based on the number of equivalents of anionic catalyst in the system.

(2) The intrinsic viscosity is measured in toluene at 25° C.

(3) $\overline{M}_w$ is the weight average molecular weight of a polymer.

(4) $\overline{M}_n$ is the number average molecular weight of a polymer.

(5) $\overline{M}_n$ lowest fraction is the number average molecular weight of the lowest molecular weight fraction obtained when a polymer is fractionated by incremental addition of methanol to a solution of the polymer in methyl ethyl ketone to form ten fractions of gradually increasing average molecular weight, each fraction comprising approximately 10% of the total polymer.

The following examples are given to illustrate the invention. Example I demonstrates the results obtained by mixing the monomer and catalyst solutions at slow speed (total mixing time—about 3–4 seconds), and Examples II–V demonstrate the results obtained by mixing the monomer and catalyst solutions at high speed (total mixing time—about 0.01 second). The half-time of the polymerization reaction in each of the examples is about 0.1–5 seconds. Since the processes described in the examples must be conducted in the substantial absence of water, oxygen, carbon dioxide, and Lewis acids, the apparatus must be properly chosen and cleaned, the chemicals purified, and an inert atmosphere maintained in the apparatus throughout the conduction of the processes to prevent the presence of any substantial amount of these contaminants. Parts mentioned in the examples are parts by weight.

*Example I*

A suitable reaction vessel, fitted with an impeller-type stirrer, is charged with a solution of 100 parts of styrene in 755 parts of 1,2-dimethoxyethane. Agitation is started by causing the stirrer to turn at a rate of about 500 r.p.m., and a solution of 1 part of sodium naphthalene in 38 parts of 1,2-dimethoxyethane is then added to the vessel. Within a few seconds the temperature rises 30–31° C., and the reaction system becomes deep red and very viscous. Active polymer is destroyed by adding 18 parts of methanol to the system, and at least a ten-fold volume of methanol is then added to precipitate polystyrene. Agitation is discontinued, and the polymer is recovered by filtration and dried. The polymerization results in about 97% conversion to a polystyrene having the following characteristics:

Intrinsic viscosity—0.791
$\overline{M}_w$—240,000
$\overline{M}_n$—150,000
$\overline{M}_n$ lowest fraction—14,000
$\overline{M}_n/\overline{M}_n$ lowest fraction—10.7
$\overline{M}_w/\overline{M}_n$—1.6

*Example II*

A monomer solution is prepared by dissolving 79 parts of styrene in 375 parts of 1,2-dimethoxyethane. A catalyst solution is prepared by reacting an excess of sodium with about 0.65 part of naphthalene in 100 parts of 1,2-dimethoxyethane to form a catalyst concentrate and dissolving 15 parts of this concentrate in 435 parts of 1,2-dimethoxyethane. The individual solutions are mixed to uniform composition by bubbling nitrogen therethrough.

Then 151 parts of the monomer solution and 150 parts of the catalyst solution are separately charged to a T-form mixing nozzle having 1 mm.-bore arms and a 2 mm.-bore stem, 5 mm. long, and simultaneously injected therethrough at a uniform speed over a period of 55–60 seconds. The sojourn time in the mixing nozzle is about 0.01 second. The effluent received from the mixing nozzle is deep red and very viscous. Active polymer is destroyed by adding 5 parts of methanol to the effluent, and at least a ten-fold volume of methanol is then added to precipitate polystyrene, which is recovered by filtration and dried. The polymerization results in 99% conversion to a polystyrene having the following characteristics:

Intrinsic viscosity—1.28
$\overline{M}_w$—346,500
$\overline{M}_n$—304,000
$\overline{M}_n$ lowest fraction—167,000
$\overline{M}_n/\overline{M}_n$ lowest fraction—1.8
$\overline{M}_w/\overline{M}_n$—1.14

*Example III*

Example II is repeated with the exception that the catalyst concentrate is prepared by reacting an excess of sodium with about 0.325 part of naphthalene in 100 parts of 1,2-dimethoxyethane. The polymerization results in 99% conversion to a polystyrene having the following characteristics:

$\overline{M}_w$—693,000
$\overline{M}_n$—630,000
$\overline{M}_n$ lowest fraction—360,000
$\overline{M}_n/\overline{M}_n$ lowest fraction—1.6
$\overline{M}_w/\overline{M}_n$—1.1

*Example IV*

A solution of 26 parts of styrene in 122 parts of 1,2-dimethoxyethane and a solution of 0.013 part of triphenylmethyl sodium in 147 parts of 1,2-dimethoxyethane are each mixed to uniform composition by bubbling nitrogen therethrough. The two solutions are then separately charged to a T-form mixing nozzle having 1 mm.-bore arms and a 2 mm.-bore stem, 5 mm. long, and simultaneously injected therethrough at a uniform speed over a period of 55–60 seconds. The sojourn time in the mixing nozzle is about 0.01 second. The effluent received from the mixing nozzle is deep red and very viscous. Active polymer is destroyed by adding 5 parts of methanol to the effluent, and at least a ten-fold volume of methanol is then added to precipitate polystyrene, which is recovered by filtration and dried. The polymerization results in about 99% conversion to a polystyrene having the following characteristics:

$\bar{M}_w$—1,025,000
$\bar{M}_n$—915,000
$\bar{M}_n$ lowest fraction—525,000
$\bar{M}_n/\bar{M}_n$ lowest fraction—1.7
$\bar{M}_w/\bar{M}_n$—1.12

Example V

Example IV is repeated with the exception that 0.026 part of triphenylmethyl sodium is used instead of 0.013 part. The polymerization results in about 99% conversion to a polystyrene having the following characteristics:

$\bar{M}_w$—512,500
$\bar{M}_n$—480,000
$\bar{M}_n$ lowest fraction—280,000
$\bar{M}_n/\bar{M}_n$ lowest fraction—1.7
$\bar{M}_w/\bar{M}_n$—1.07

The process of the invention is a polymerization process wherein a solution of an anionically-polymerizable vinylidene monomer is mixed with a solution of an anionic catalyst at a rate at least four times faster than the polymerization rate.

The catalyst may be any anionic catalyst capable of initiating polymerization of vinylidene monomers. Such catalysts are already known to the art and are usually members of the group consisting of ion-radical adducts and alkali metal salts of very weak acids. The ion-radical adducts are 1:1 adducts of an alkali metal, i.e., Li, Na, K, Rb, or Cs, and an organic compound capable of forming an ion-radical adduct therewith, e.g., polycyclic aromatic hydrocarbons and alkyl derivatives thereof, such as naphthalene, methylnaphthalene, anthracene, phenanthrene, etc.; aromatic ketones, such as benzophenone, acetophenone, etc. The alkali metal salts are the Li, Na, K, Rb, and Cs salts of very weak acids having a pKa value greater than about 27, e.g., xanthane, phenylxanthane, diphenylbiphenylmethane, triphenylmethane, diphenyl-alpha-naphthylmethane, diphenylmethane, diphenylmethylethylene, cumene, etc.

These catalysts are usually used in the form of solutions containing at least 20% by weight of an inert polar solvent, based on the weight of catalyst, and preferably containing a much higher proportion of solvent for ease of operation in conducting the polymerization. Suitable polar solvents include 1,2-dimethoxyethane, 1,2-diethoxyethane, tetrahydrofuran, dioxane, dioxolane, Carbitol ethers, Cellosolve ethers, aliphatic ethers such as dimethyl ether, diethyl ether, etc., cycloaliphatic ethers such as methoxycyclohexane, etc., aromatic ethers such as diphenyl ether, etc.

Vinylidene compounds which can be polymerized in accordance with the invention include vinyl aromatic compounds such as styrene, vinyltoluene, vinylnaphthalene, etc., ar-alkoxy substituted vinyl aromatic hydrocarbons, e.g., o-, m-, and p-methoxystyrenes, etc., conjugated dienes such as butadiene, isoprene, etc., acrylic-type esters such as methyl acrylate, methyl methacrylate, etc., vinyl ethers such as vinyl methyl ether, etc.

The solvents in which the vinylidene monomers can be dissolved to form the monomer solutions are inert organic solvents such as the polar solvents mentioned above as solvents for the catalysts and non-polar solvents such as aromatic hydrocarbons and alkyl derivatives thereof, e.g., benzene, toluene, xylenes, ethyl benzene, diphenyl, etc., cycloaliphatic hydrocarbons and alkyl derivatives thereof, e.g., cyclohexane, methylcyclohexane, etc., saturated aliphatic hydrocarbons containing 2–30 carbon atoms, e.g., butane, pentane, hexane, octane, dodecane, etc., aliphatic olefins which are non-polymerizable in the system, e.g., propene, butene, pentene, etc.

Polymerization of the vinylidene monomers is accomplished in an inert atmosphere in the substantial absence of water, oxygen, carbon dioxide, and Lewis acids by mixing the monomer and catalyst solutions at a rate at least four times faster, preferably at least ten times faster, than the polymerization rate. This rapid admixture can be achieved by the use of any technique and apparatus conventionally used for high speed mixing in chemical reactions, provided that the technique and apparatus be adaptable to a process which must be conducted in the substantial absence of the aforementioned contaminants. Use of a T-form mixing nozzle, as shown in the examples, is particularly advantageous.

The polymerization conditions and the concentrations of the constituents of the reaction mixture can be varied in manner known to the art for ease of operation, control of the molecular weight of the product, etc. Preferably, the polymerizations are conducted at temperatures below the boiling points of the solvents used, usually in the range of −80° to 100° C., at atmospheric or superatmospheric pressure. The reaction mixture usually contains about 10–55% by weight of monomer, based on the total weight of solvent, i.e., the weight of solvent in the monomer solution and the weight of solvent in the catalyst solution. The amount of catalyst employed is dependent on the molecular weight desired for the product, the average weight molecular weights of the polymers being proportional to the reciprocal of the catalyst concentration, as shown particularly by comparison of Example II with Example III and of Example IV with Example V. Usually the reaction mixture contains about 0.05–1% by weight of catalyst, based on the weight of monomer. Advantageously, the polymerization is conducted by continuous process techniques, the monomer and catalyst solutions being mixed in equal volume proportions.

The polymers produced by the process of the invention are characterized by a narrow molecular weight distribution and a predetermined average molecular weight which is a function of the catalyst concentration. Since the polymers produced by the process are "living," i.e., capable of further reaction, the average molecular weights and molecular weight distributions of the products can be varied at will by reacting the active effluent from high speed mixing of the synthesis components with additional monomer. If high speed mixing techniques are used in this reaction with additional monomer, the average molecular weight of the polymer is increased without any substantial broadening of the molecular weight distribution. If slow mixing techniques are used in the reaction with additional monomer, the average molecular weight of the polymer is increased and the molecular weight distribution is broadened.

Thus, the invention is particularly advantageous in that it permits the formation of polymers having any desired average molecular weight and any desired molecular weight distribution. Polymers formed by high speed mixing of the synthesis components have molecular weight distributions at least as narrow as can be obtained by careful fractionation of polymers formed by free-radical catalysis. Also, the process permits a correlation between catalyst concentration and average molecular weight of the product which is not permitted by anionic polymerizations conducted under slow speed mixing conditions.

It is obvious that many variations may be made in the products and processes set forth above without departing from the spirit and scope of this invention.

What is claimed is:

1. In a process for polymerizing an anionically-polymerizable vinylidene monomer of the group consisting of a vinyl aromatic hydrocarbon, an ar-alkoxy vinyl aromatic hydrocarbon, a conjugated diene, an alkyl acrylate, and an alkyl methacrylate at a temperature in the range of −80° to 100° C. in an inert organic solvent under the catalytic influence of an anionic catalyst of the group consisting of an ion-radical adduct of an alkali metal and a polycyclic aromatic hydrocarbon, an ion-radical adduct of an alkali metal and an aromatic ketone, and an alkali metal salt of a very weak acid having a pKa value greater than about 27, the improvement which comprises mixing the monomer with the catalyst at a rate at least four times faster than the polymerization rate.

2. A process as in claim 1 wherein the monomer is styrene.

3. A process as in claim 1 wherein the catalyst is an ion-radical adduct of an alkali metal and a polycyclic aromatic hydrocarbon.

4. A process as in claim 1 wherein the catalyst is an alkali metal salt of a very weak acid having a pKa value greater than about 27.

5. A process as in claim 1 wherein the monomer is styrene, the inert organic solvent is 1,2-dimethoxyethane, and the catalyst is sodium naphthalene.

6. A process as in claim 1 wherein the monomer is styrene, the inert organic solvent is 1,2-dimethoxyethane, and the catalyst is triphenylmethyl sodium.

References Cited in the file of this patent

UNITED STATES PATENTS

| | | |
|---|---|---|
| 2,181,771 | Scott | Nov. 28, 1939 |
| 2,608,555 | Bullitt | Aug. 26, 1952 |
| 2,841,574 | Foster | July 1, 1958 |